Nov. 29, 1955 W. A. DOHERTY ET AL 2,725,085
EXTENSIBLE HACK SAW FRAME WITH PIVOTED
BLADE TIGHTENING MEMBER
Filed Oct. 21, 1954 2 Sheets-Sheet 2
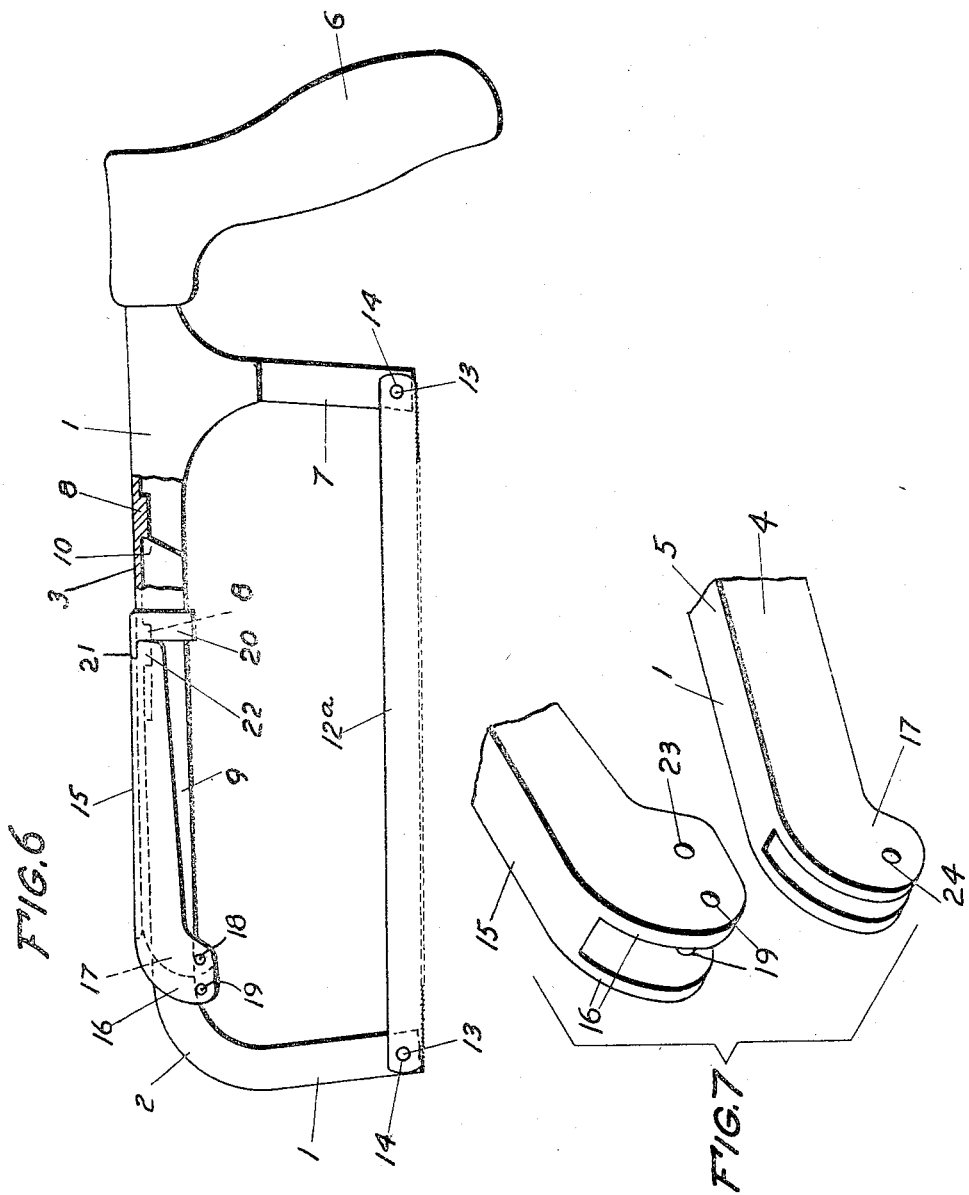
INVENTORS
WILLIAM A. DOHERTY
HORACE A. KELLEY
BY Louis C. Smith
ATTORNEY

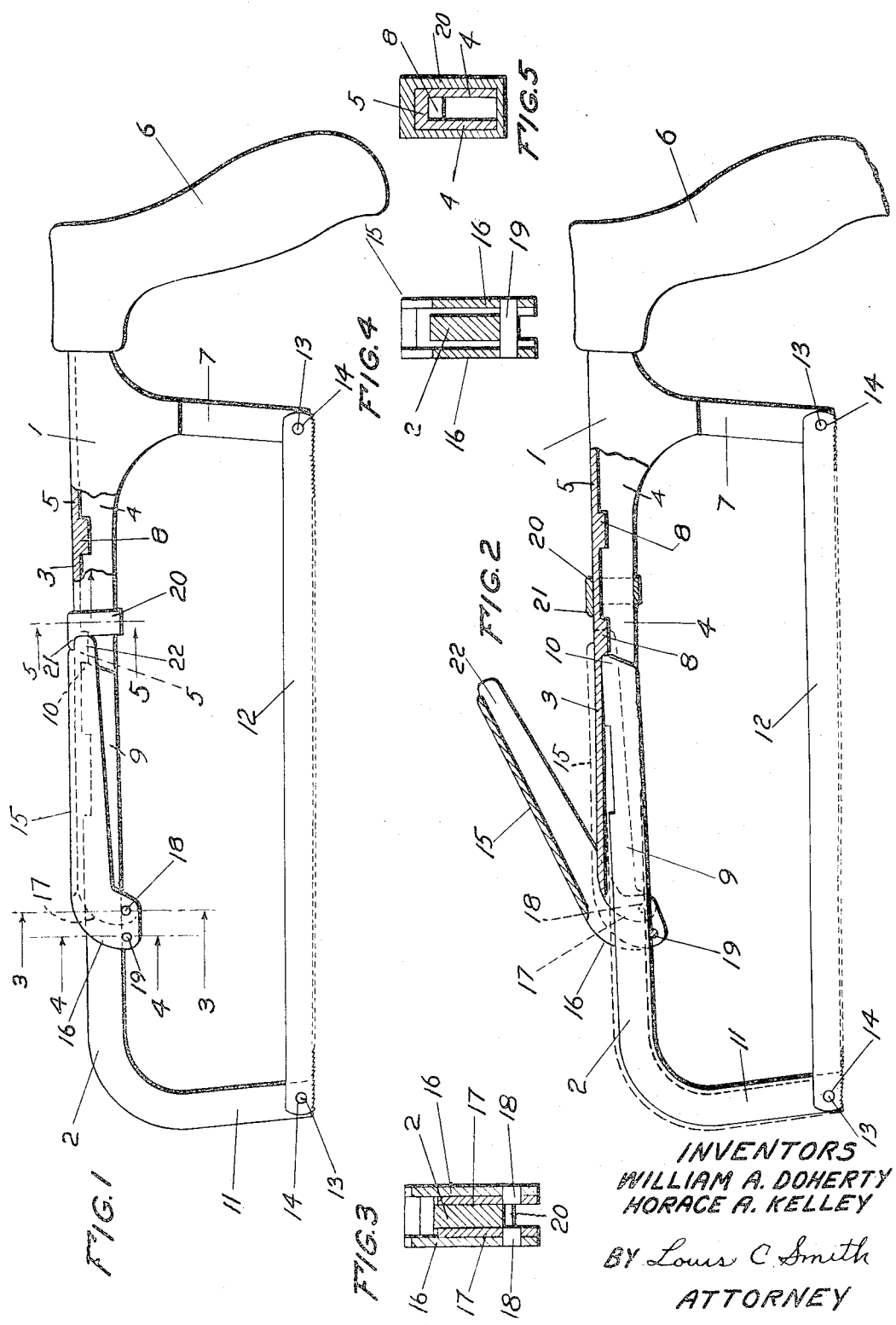

United States Patent Office 2,725,085
Patented Nov. 29, 1955

2,725,085

EXTENSIBLE HACK SAW FRAME WITH PIVOTED BLADE TIGHTENING MEMBER

William A. Doherty and Horace A. Kelley, Franklin, N. H., assignors to G. W. Griffin Co., Franklin, N. H., a corporation of New Hampshire Application October 21, 1954, Serial No. 463,751

1 Claim. (Cl. 145—34)

This invention relates to hack saws and especially to the frame portion thereof, and an object of the invention is to provide a novel hack saw frame by which the placing of the saw blade under tension when it is to be used, or relieving the tension thereof when the blade is to be removed, can be quickly and easily performed.

In the drawings wherein there is illustrated a selected embodiment of the invention:

Fig. 1 is a view of the hack saw frame in operative condition;

Fig. 2 shows the hack saw frame with the tension on the blade relieved, thus putting the frame in condition to have the blade removed therefrom or replaced therein;

Fig. 3 is a section on the line 3—3, Fig. 1;

Fig. 4 is a section on the line 4—4, Fig. 1;

Fig. 5 is a section on the line 5—5, Fig. 1;

Fig. 6 is a view similar to Fig. 1 but showing the frame adjusted for a short blade;

Fig. 7 is an exploded view illustrating the end portion of the main frame member and the end portion of the blade-tightening member in position to be assembled.

The hack saw frame herein illustrated comprises a main frame member 1 and an auxiliary frame member 2. The body portion 3 of the main frame member 1 is channel-shaped in cross section, it having the two side portions 4 connected by the bridge portion 5. Said main frame section 1 also has at its outer end a handle member 6 and it further has a laterally extending blade supporting arm 7. Said main frame member is made with one or more abutment elements 8 located within the channel thereof, the purpose of which will be presently set forth.

The end portion 9 of the auxiliary frame member 2 is of a size and shape to fit within the channel of the main frame member, and when in operative position the end 10 of the auxiliary frame abuts against one of the abutments 8, as shown in Fig. 2. The auxiliary frame member is also provided with a laterally extending blade-supporting arm 11, and each of the blade-supporting arms 7 and 11 has suitable means for attaching the hack saw blade 12 thereto. In the embodiment of the invention shown each supporting arm 7 and 11 has a pin 13 extending laterally therefrom adapted to be received within the usual hole 14 with which hack saw blades are commonly provided.

Pivotally mounted on the end of the main frame member 1 is a blade-tightening member 15 which performs the dual function of retaining the auxiliary frame member 2 in its proper position relative to the main frame member and placing the saw blade under proper tension to enable it to satisfactorily perform a metal cutting operation. This blade-tightening element 15 is channel-shaped and has a straddling relation relative to the main frame member 1. Said blade-tightening member is formed at one end with two cheek pieces 16 which straddle the end 17 of the main frame member 1, each cheek piece 16 being pivotally secured to the corresponding side of the main frame element by means of a pivot pin 18 which occupies two aligned apertures 23, 24 in the cheek piece and end 17. The blade-tightening member is thus mounted on the main frame member for swinging movement between an operative closed position shown in Fig. 1 and an open position shown in Fig. 2.

The two cheek pieces 16 of the blade-tightening member are connected by a pin 19 which is located below or on the inside of the body portion 9 of the auxiliary frame member 2.

When the blade-tightening member 2 is in its open position shown in Fig. 2 with the end 10 of the auxiliary frame member engaging one of the abutments 8, said auxiliary frame member will have the full line position shown in Fig. 2 and will be slightly out of line with the body portion of the main frame member 1. When the parts are in this position the hack saw blade 12 is loosely retained on the pins 13 but is not under any tension. When the blade-tightening member 15 is swung from its open position shown in Fig. 2 into its closed operative position shown in Fig. 1, the pin 19 will apply a pressure to the inside of the auxiliary frame member and will give the latter a slight swinging movement about the fulcrum point where the end 10 engages the abutment 8, thereby bringing the auxiliary frame into proper alinement with the main frame member, as shown by dotted lines in Fig. 2 and by full lines in Fig. 1. This change of position of the auxiliary frame member 2 will place the hack saw blade 12 under tension in the direction of its length and will thus put it in condition for use in cutting metal.

Means are provided for locking the blade-tightening member 15 in its operative position, and in the construction herein shown such means comprise a locking collar 20 which encircles the body of the main frame member 1 and is slidable longitudinally thereon. This locking collar 20 has a lip 21 which is adapted to be moved over and into locking engagement with the end portion 22 of the blade-tightening member 15, as shown in Fig. 1.

The operation of removing a hack saw blade from the frame involves only the matter of sliding the locking collar 20 to the right, Fig. 1, to release the blade-tightening member 15, thereby allowing the latter to be moved into its open position in which all tension on the hack saw blade is removed.

After a hack saw blade has been placed in a frame the matter of applying the necessary tension on the blade involves only the swinging of the blade-tightening member 15 from its open to its closed position and the sliding of the collar 20 into its locking engagement with the member 15.

The hack saw frame herein illustrated is also adjustable as to its length to accommodate hack saw blades of different lengths. This is provided for by the use of two or more abutments 8 within the channel of the main frame member, two such abutments being herein illustrated. When a long hack saw blade is to be used, the auxiliary frame member 2 is adjusted so that its end 20 will engage the left hand abutment 8 in Fig. 2. If a shorter blade is to be used, the auxiliary frame member 2 will be adjusted to bring its end 10 into engagement with the other abutment 8, as shown in Fig. 6, thereby shortening the frame to a proper extent to accommodate a shorter blade 12a, as shown in Fig. 6.

We claim:

A hack saw frame comprising a main frame member having a body portion channel shaped in cross section, and also having a handle at one end thereof, and a laterally extending blade supporting arm adjacent the handle and an interior abutment within said body portion, an auxiliary frame member having an end portion fitting within said channel shaped body portion with its end engaging said abutment, said auxiliary frame member extending beyond the other end of the main frame member and having at its extended end a second laterally extending blade-supporting arm, each blade-supporting arm having means for the attachment thereto of a hack saw blade, and a blade-tightening member having two parallel cheek portions which straddle the main frame member and are pivotally connected to the sides thereof, said blade-tightening member also having a transverse member connecting the cheek pieces and located beyond its pivotal connection with the main frame member, and beneath the auxiliary frame member, said blade-tightening member being swingable between an open position and a closed operative position, whereby when the blade-tightening member is moved into its closed operative position said transverse member acts against the auxiliary frame member and turns it about its point of engagement with the abutment, thereby applying to a hack saw blade mounted on said supporting arms a working tension.

References Cited in the file of this patent

UNITED STATES PATENTS

| | | |
|---|---|---|
| 1,146,604 | Whitcomb | July 13, 1915 |
| 1,663,076 | Garner | Mar. 20, 1928 |
| 2,308,354 | Clemson | Jan. 12, 1943 |

FOREIGN PATENTS

| | | |
|---|---|---|
| 45,074 | Sweden | Mar. 23, 1917 |
| 53,152 | Sweden | Dec. 6, 1922 |
| 932,043 | France | Nov. 17, 1947 |